United States Patent [19]
Austin

[11] 3,709,675
[45] Jan. 9, 1973

[54] PROCESS FOR PRODUCING LIQUID NP FERTILIZERS

[75] Inventor: James Austin, Horley, England

[73] Assignee: Occidental Research & Engineering Limited, London, England

[22] Filed: April 2, 1969

[21] Appl. No.: 812,606

[52] U.S. Cl. ........................................71/35, 71/36
[51] Int. Cl. ........................................C05b 7/00
[58] Field of Search .........71/35, 36, 43; 23/107, 103

[56] References Cited

UNITED STATES PATENTS

| | | | |
|---|---|---|---|
| 3,537,814 | 11/1970 | Farr et al. | 71/43 X |
| 3,459,499 | 8/1969 | Mullen | 71/43 X |
| 2,902,342 | 9/1959 | Kerley | 71/43 X |
| 3,165,395 | 1/1965 | McCamy et al. | 71/35 X |
| 3,244,500 | 4/1966 | Stinson et al. | 71/43 X |
| 3,301,657 | 1/1967 | Dee et al. | 71/43 |
| 3,336,127 | 8/1967 | Hignett et al. | 71/34 |
| 3,382,059 | 5/1968 | Getzinger | 71/43 X |
| 3,464,808 | 9/1969 | Kearns | 71/43 X |
| 3,492,087 | 1/1970 | MacGregor et al. | 71/43 X |

FOREIGN PATENTS OR APPLICATIONS

| | | | |
|---|---|---|---|
| 632,617 | 12/1961 | Canada | 71/35 |
| 695,781 | 10/1964 | Canada | 71/36 |
| 388,417 | 2/1933 | Great Britain | 71/35 |

OTHER PUBLICATIONS

Concentration of Wet Process Acid to Obtain Self Sequestering Properties Siegel, June 11, 1959 Pg. 30

*Primary Examiner*—Samih N. Zaharna
*Assistant Examiner*—Richard Barnes
*Attorney*—William N. Patrick

[57] ABSTRACT

Phosphoric acid, containing polyphosphoric acid components, and nitric acid are concurrently and continuously reacted with a deficiency of ammonia under high turbulent conditions to vaporize water in the reacting mixture and to expel the latter from a reaction chamber after a brief retention period; the expelled mixture is quenched by air cooling and thereafter reacted with further ammonia to near-neutrality.

4 Claims, 3 Drawing Figures

INVENTOR
JAMES AUSTIN
BY
William N. Patrick
ATTORNEY

INVENTOR
JAMES AUSTIN
BY
William N. Patrick
ATTORNEY

PROCESS FOR PRODUCING LIQUID NP FERTILIZERS

This invention relates to the ammoniation of phosphoric acid and the production of liquid fertilizers containing the plant foods $P_2O_5$ and nitrogen. More particularly the invention relates to the ammoniation of phosphoric acid containing polyphosphoric acid components in a manner such as to minimize hydrolysis of the polyphosphoric acids while contemporaneously ammoniating nitric acid thereby to produce a liquid containing the said plant foods in selected proportions.

Phosphoric acid and superphosphoric acid (the latter containing polyphosphoric acid components) have been ammoniated in the past by feeding ammonia to an aqueous solution of the acid, accompanied by stirring and cooling to 180°F. or lower temperatures in order to prevent hydrolysis of the polyphosphoric acid components of the acid and the loss of ammonia which begins to bubble out of the solution at a temperature of about 180°F. Phosphoric acid containing 83 percent $P_2O_5$ (superphosphoric acid) has been employed in an ammoniation process to produce 11-37-0 (11 percent by weight nitrogen, 37 percent by weight $P_2O_5$, and 0 percent $K_2O$, potash) grade liquid. That process involved dilution of the 83 percent $P_2O_5$ acid to 80–81 percent $P_2O_5$, followed by the addition of ammonia and the dissipation of heat by evaporation of water. The ammoniation process was conducted in a solution kept at the boiling point of the 11-37-0 liquid (about 217°F.). After ammoniation the product was cooled to 100°F by cooling coils or similar means. In this prior art method the diluted acid was ammoniated in 20 minutes to produce the 11-37-0 liquid. At the temperature of 217°F., some loss of ammonia was indicated by the odor of the effluent gases, and reversion of polyphosphoric acids to orthophosphoric acid by hydrolysis was considerable.

The above discussion indicates that there is a need for a process of rapidly ammoniating phosphoric acid, especially phosphoric acid containing polyphosphoric acid components, which minimizes the loss of polyphosphoric acid components by hydrolysis during the ammoniation process. Such a process is one objective of the invention of co-pending application Ser. No. 684,348 filed Nov. 20th, 1967 and now abandoned and of the continuation in part thereof, Ser. No. 785,321 filed Dec. 19th, 1968, and now abandoned both assigned to my assignee.

The ammoniation of phosphoric acid to produce a liquid of near-neutral pH results in that liquid having an $N:P_2O_5$ ratio of about 1:3, or of slightly higher $P_2O_5$ proportion in the case of ammoniating an acid having a substantial polyphosphoric acid content that is not hydrolyzed in the ammoniation. Often it is desired to produce a liquid having a substantially different $N:P_2O_5$ ratio and hitherto this has involved the modification of the liquid produced by ammoniation of the acid by the addition to that liquid of other components, for instance ammonium nitrate and/or urea, a typical modification being the addition to 10-34-0 grade ammonium phosphates solution of so-called nitrogen-base solution of 35-0-0 grade, that is a solution of a mixture of ammonium nitrate and urea.

An objective of the present invention is to adapt the process and apparatus of the aforesaid application Ser. No. 684,348 so as to enable the direct production of near-neutral liquids having $N:P_2O_5$ ratios higher than obtainable solely by the ammoniation of phosphoric acids.

Accordingly, therefore, in one aspect the present invention provides a process that comprises introducing streams of water, ammonia, nitric acid and phosphoric acid containing polyphosphoric acid components continuously into a reaction chamber for intermingling therein under conditions of high turbulence, the proportion of ammonia relative to the acids introduced into said chamber being less than that required for neutralization of the acids and the conditions being such that the introduced ammonia is substantially totally reacted to produce a liquid reaction mixture and steam, withdrawing said reaction mixture and steam and separating the latter from the liquid, quenching said liquid and finally reacting said liquid with ammonia in an amount to produce a near neutral liquid product.

In this process the nitric acid and the phosphoric acid react with the ammonia to produce, respectively, ammonium nitrate and ammonium phosphates. By adjustment of the relative proportions of the respective acids the proportions of nitrate and phosphates in the final liquid product may be controlled so as to result in the latter having a selected $N:P_2O_5$ ratio exceeding 1:3.5. It should be understood that in the absence of the phosphoric acid feed the product would be an ammonium nitrate solution having a $N:P_2O_5$ ratio of 1:0.

The reactants may all be brought together simultaneously in the reaction chamber or, as is preferred, the nitric acid may be added downstream of the point of introduction of the ammonia, phosphoric acid and water streams, thereby to minimize hydrolysis of polyphosphoric acids by the nitric acid which will usually be introduced in the form of a 55 percent solution.

The process may otherwise be performed as described in the aforesaid Application; that is, the reactants may be caused to react in said reaction chamber within a period ranging from 0.1 second to about 15 minutes, the shorter periods within this range being preferred especially when the reactants comprise a substantial proportion of phosphoric acid having polyphosphoric acid components the hydrolysis of which is to be minimized.

Likewise, the reaction is the reaction chamber may be performed at temperatures such as disclosed in said application, reaction temperatures within the range 150–350 °F. being satisfactory but the reaction preferably being performed at a temperature within the range 220–280 °F.

The quenching step is preferably accomplished by countercurrent contact with air, the liquid temperature being thereby reduced rapidly to within the range 80–150 °F. Following the quenching step, the liquid may be further cooled by indirect heat-exchange with one or more of the reactants, conveniently while being further ammoniated, and possibly diluted with water, thereby to produce a final liquid product of selected pH and specific gravity.

As in the case of the process described in said Application, the ammonia reactant may be liquid or gaseous at the point of entry to the reaction chamber.

The process of the invention may be performed in apparatus generally as described in said application Ser. No. 684,348 but modified to enable the extra reactant, nitric acid, to be introduced into the reaction chamber concurrently with the other reactants. Thus that apparatus may be provided with an extra inlet for the nitric acid reactant, this inlet either being positioned to bring the nitric acid immediately into contact with the other entering reactants or being positioned to introduce the nitric acid into the reaction chamber so as to meet a reacting mixture of the other reactants; the latter arrangement is preferred. It should be understood that the nitric acid may be of any suitable concentration. Usually a 55 percent aqueous solution will be a convenient feedstock but, if desired, more or less of the required water may be introduced as solvent for the nitric acid reactant, it being understood that substantially all of the required water could be introduced in this way, especially in the case in which the apparatus has its nitric acid inlet positioned to bring the introduced nitric acid into immediate contact with the phosphoric acid and ammonia reactants. That is, the apparatus as described in the aforesaid Application could be used without modification beyond arranging for the feeding of an appropriate mixture of water and nitric acid to the reaction chamber through the inlet used, in the process described in said application, solely for water introduction.

The process of the invention will be further explained with reference to its performance in apparatus constructed and arranged as described in the said application Ser. No. 684,348 and as illustrated in the accompanying drawings, in which.

Figure 1:
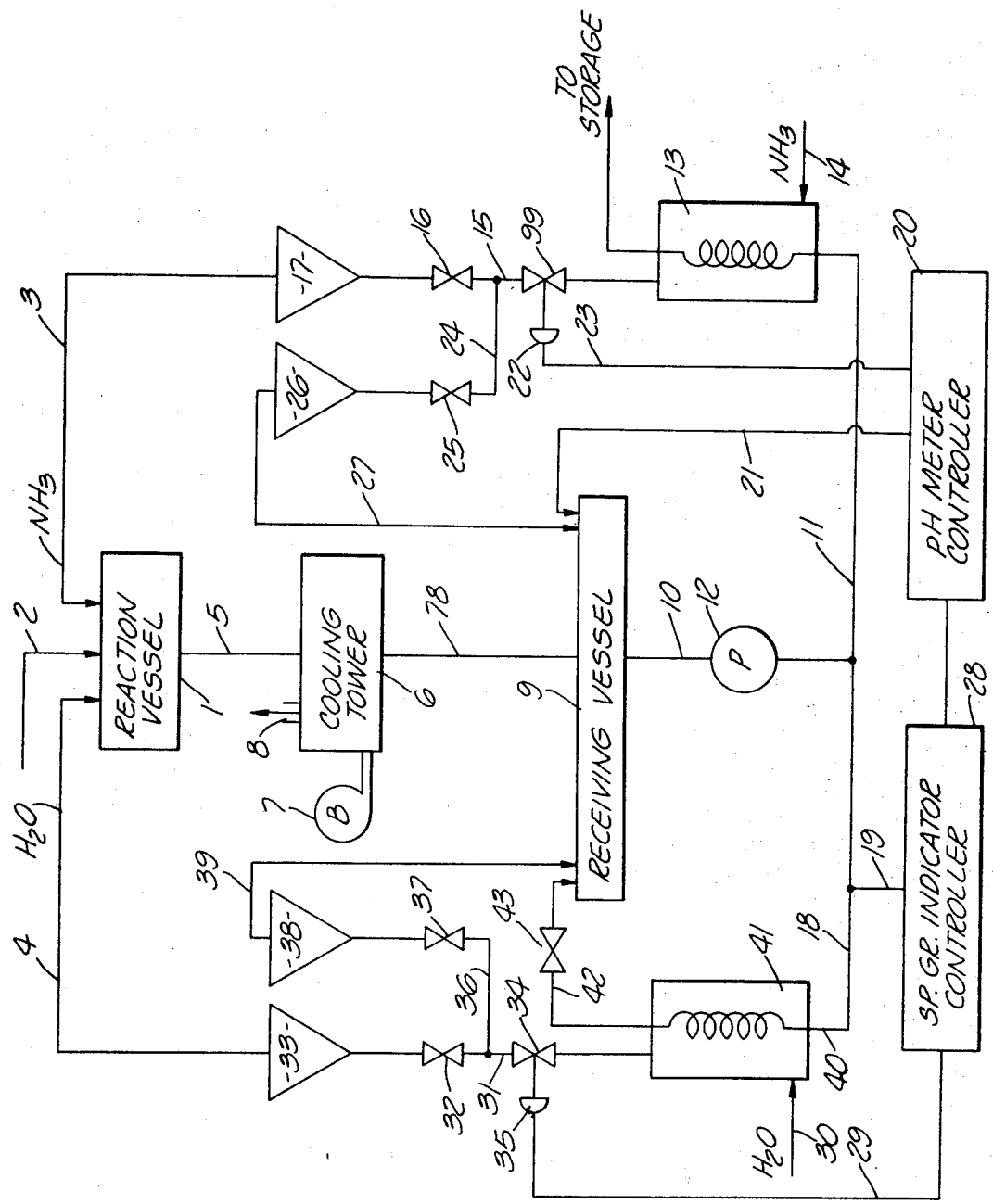
FIG. 1 is a schematic diagram.

Referring to the drawings, FIG. 1 represents, schematically, operation of a process in which either wet process or furnace phosphoric acid, anhydrous ammonia and aqueous nitric acid are admitted into a reaction vessel 1 through conduits 2, 3 and 4, respectively. Wet process phosphoric acids contain small amounts of iron and aluminum impurities as well as impurities of other substances found in phosphate bearing ores. The phosphoric acid, which in the process of the present invention contains polyphosphoric acid components, is metered into the reaction vessel by conventional metering apparatus such as a metering pump or magnetic flow meter, not shown. Ammonia reacts with the acids to form ammonium phosphate, ammonium polyphosphates and ammonium nitrate with the liberation of heat. The amount of water added to the reaction vessel is sufficient to keep the temperature of the reaction mixture within the range 65–177°C.

The heat liberated upon ammoniation of the acids is sufficient to convert part of the water to steam.

The reaction product mixture, including unammoniated acids, is discharged through a conduit 5 into a cooling tower 6. The reaction product mixture is cooled in the tower 6 by contact with a countercurrent flow of air supplied by a blower 7. The air and water vapor are vented through a vent 8, together with any steam present in the reaction product mixture coming from the reaction vessel 1. The reaction product mixture which has been cooled to a temperature of from about 27°C. to about 65°C. is discharged through a reaction product outlet 78 into a reaction product mixture receiving vessel 9.

The reaction product mixture can be transferred through conduits 10 and 11 to storage either by gravity or with the aid of a pump 12. Should it be desirable to lower the temperature of the reaction product, it may be passed in heat-exchanging relationship with ammonia through a heat-exchanger 13.

Ammonia is fed in through inlet 14, heat exchanger 13, conduit 15, valve 16, meter 17, and conduit 3 to the inlet to reaction vessel 1.

Water employed in the process is fed to the inlet of a conduit 30 through a conduit 31, valve 32, meter 33 and conduit 4 to the reaction vessel 1.

The nitric acid employed in the process is also fed to the reaction vessel 1 via conduit 4, being introduced into the latter near its connection with vessel 1 through a suitable branch connection (not shown) to conduit 4, the amount of nitric acid being controlled by suitable metering equipment (not shown) so as to maintain a chosen relationship between the flows of the nitric and phosphoric acids to the vessel.

The ammonia and nitric and phosphoric acids can be admitted to the reaction vessel in the correct proportions to obtain a reaction product having the desired pH. Preferably, however, a portion of the reaction product is routed through a conduit 19, pH meter-controller 20 and a conduit 21 back to the receiving vessel 9. The pH meter-controller monitors the pH of the reaction product and provides an electrical outlet signal of a phase and magnitude proportional to the direction and degree of deviation of the measured pH from a predetermined pH set in the instrument. Equipment for measuring the pH and providing a pH meter-controller output signal is readily available commercially and will not be further described here. A valve 99 in ammonia conduit 15 is actuated by valve actuator 22 in response to the output signal from the pH meter-controller 20 received through electrical conductor 23. Valve actuator 22 so controls the valve 99 as to increase or decrease the flow of ammonia therethrough so as to bring the pH of the reaction product back to the predetermined pH set on the pH meter-controller instrument. For example, when the pH is higher than the predetermined value, the opening of valve 99 is reduced thereby reducing the flow therethrough, which will have the effect of producing a reaction product with a lower pH. On the other hand, if the pH is too low, valve actuator 22, in response to the signal from the pH meter-controller, turns valve 99 to increase the opening therethrough, allowing ammonia to flow through conduit 15 at a higher rate to thereby provide a product with a higher pH.

Not all the ammonia required for neutralization of the acids is fed to the reaction vessel 1 via conduit 3: up to about 30 percent of the ammonia required is, instead, fed to the reaction product mixture in receiving vessel 9 through a conduit 24, valve 25, meter 26 and conduit 27. Valves 16 and 25 may be adjusted to permit, for example, about 85 percent of the ammonia used in the process to flow through conduit 3 to the inlet to reaction vessel 1 and about 15 percent to flow through meter 26 and conduit 27 to the reaction product receiving vessel where the reaction product mixture is further ammoniated. The ammonia is bubbled into the reaction product mixture through a sparger, not shown, located near the bottom of the vessel. The total amount of ammonia employed in the process is controlled by the pH meter-controller 20.

A specific gravity indicator-controller 28 may, as shown, be mounted in conduit means 19 to monitor the specific gravity of the portion of reaction product that is being circulated through conduit 19, pH meter-controller 20 and back to the receiving vessel 9 through conduit 21. The specific gravity indicator-controller monitors the specific gravity of the reaction product mixture and provides an electrical output signal to electrical conductor 29 of a phase and magnitude proportional to the direction and degree of deviation of the specific gravity from the predetermined specific gravity which has been set on the specific gravity indicator instrument. Equipment for measuring specific gravity and providing a specific gravity controller output signal, is readily available commercially and will not be described here.

Valve 34 in conduit 31 is controlled by valve actuator 35 and controls the amount of water flowing through conduit 31. Valve controller 35 is responsive to the output signal from specific gravity indicator-controller 28 and increases or decreases the opening of valve 34 to as to permit that amount of water to flow therethrough which will provide an end product having a predetermined specific gravity. For example, if the specific gravity is too low the valve controller 35 will decrease the opening of valve 34 to permit less water to flow therethrough, thereby increasing the density of the reaction product. On the other hand, if the specific gravity of the reaction product is too high, the valve controller 35, in response to the signal from the specific gravity indicator-controller 28, will turn the valve 34 to increase the opening therethrough, allowing more water to flow through conduit 31 and thereby providing a product having a lower specific gravity.

All the water may be fed to the reaction vessel 1 via the conduit 4 or, as indicated some, e.g. up to about 30 percent, of the water flowing through control valve 34 may be routed through a conduit 36, valve 37, meter 38 and a conduit 39 to the receiving vessel 9. For example, the total amount of water employed in the process can be divided to provide for a flow of about 80 percent of such water through meter 33 to the reaction vessel 1 and 20 percent of the water through meter 38 and conduit 39 to the reaction product receiving vessel 9.

If desired, a portion of the reaction product mixture may be recirculated in heat-exchanging relationship with the water employed in the process through a conduit 40, heat exchanger means 41, conduit 42, valve 43 and back to the receiving vessel means 9.

Figure 2:
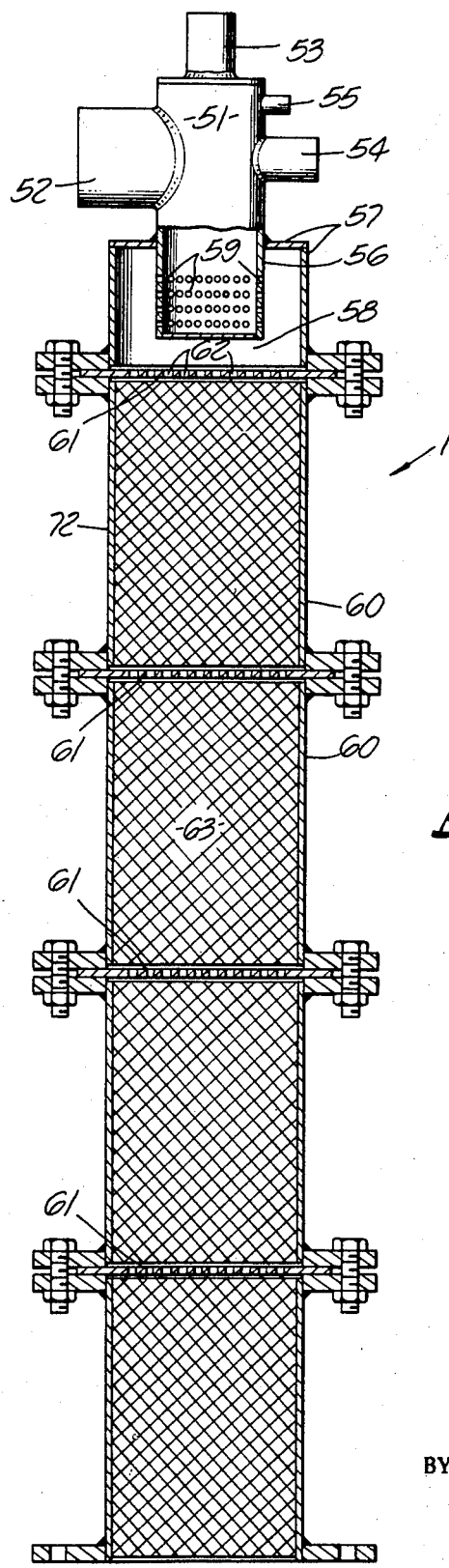
FIG. 2 is a view partially in section of the reaction vessel of FIG. 1.

FIG. 2 shows a preferred form of the reaction vessel 1, having a fluid receiving means 51 with one end thereof extending into the interior of a column 72. The fluid receiving means 51 is equipped with inlet means 52, 53 and 54 for phosphoric acid, ammonia and aqueous nitric acid, respectively. The fluid receiving means may be equipped with means for attaching pressure indicating devices and other instruments, as at 55. The end portion of the fluid receiving means 51, which is encompassed by the closed end 57 of the column 72, has a closed end 58 and a wall 56 with a plurality of apertures 59 providing communication between the interior of the fluid receiving means 51 and the interior of the column 72. The number and size of the apertures in the wall 56 depends on the capacity of the apparatus, that is, the volume of reaction mixture components required to pass therethrough per unit time. The apertures may be circular, square or any other desired shape. It is found that circular apertures having a diameter of from about one-sixteenth inch to about three-fourths inch, or higher, are satisfactory for the process of this invention. Circular apertures having a diameter of from about one-eighth to about three-eighths inch are preferred since they impart a good degree of mixing to the components fed to the fluid receiving means as they pass therethrough. Especially preferred are circular apertures having a diameter of one-fourth inch, as these provide a good mixing of product. The apertures can be spaced from about one-fourth inch apart, in the case of apertures having a diameter of one-eighth inch, to about 1½ inches apart in the case of apertures having a diameter of three-fourths inch. Apertures having a diameter of one-fourth inch can be spaced from about three-eighths to about three-fourths inch apart. Apertures having a diameter of one-fourth inch disposed about one-half inch apart in the walls of the end 56 of the fluid receiving means 51 are found to perform satisfactorily for the process of this invention.

The apertures 59 in wall 56 of the fluid receiving means 51, in diameter and number should be such as to provide a pressure drop for fluid passing therethrough in the range of about 1 to about 100 psi. It is preferred that the pressure drop be within the range 2 to about 60 psi for thorough mixing of the components of the reaction mixture passing therethrough.

The column 72 is composed of plurality of cylindrical sections 60 with a flange or other means at each end of a section such that the sections are adapted to being stacked and fastened together by means of bolts or other retaining means as shown in the drawing. The section 57 which encompasses end 56 of the fluid receiving means 51 also has a flange or other means at the open end thereof adapted for mounting said fluid receiving means 51 onto one end of the column 72. A plurality of plate members 61 having a plurality of apertures in each, obturate the column in spaced apart relationship. A plate member 61 is mounted in between two sections of the column at a plurality of junctions of such plurality of sections 60. The apertures 62 in the plates 61 can have the same characteristics as the apertures 59 in the wall 56 of fluid receiving means 51. When the apertures 62 are circular, the diameter thereof can vary from about one-sixteenth inch to about 1 inch. Apertures having a diameter of from about one-fourth to about three-fourths inch are found to serve satisfactorily in providing a means for mixing the components making up the reaction mixture in this invention. Suitable packing 63 is disposed between the plate members 61. The requirement of the packing is that it provides for a mixing of the components passing therethrough in order to enhance the efficiency of ammoniation of the acid. Suitable packing material for example is ⅛ to 2 inch stainless steel pipe cut into sections of one-fourth inch to about 2 inches. Pall or Raschig packing, berl, saddles, grid packing and spiral grids, are examples of other packing material that can be employed. The material of construction of equipment used in the process of this invention can be any corrosion resistant material such as, for example stainless steel.

Figure 3:
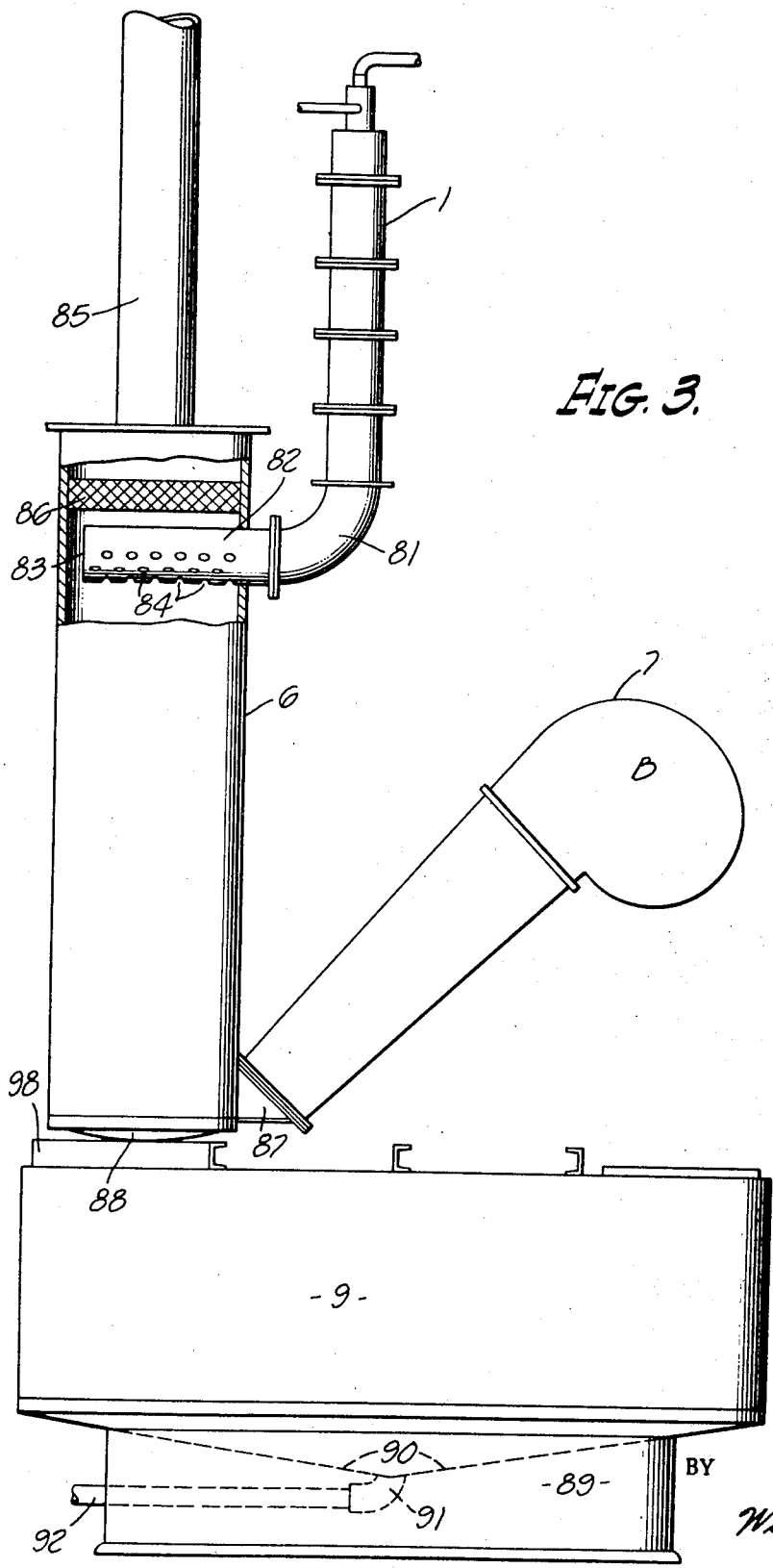
FIG. 3 is a view, partially in section, of the reaction vessel, the cooling tower, the air blower and the reaction product receiving vessel.

FIG. 3 shows the preferred relationship between the reaction vessel 1, the cooling tower 6 and the receiving vessel 9. The reaction vessel 1 is connected via connecting means 81 to a distributor 82 which extends into the interior of the upper end of the cooling tower 6. The distributor 82 is closed at its free end 83 and has a plurality of apertures 84 in its walls providing communication between the interior of the distributor and the interior of the cooling tower. The apertures 84 can have the same characteristics as the apertures 59 in the wall 56 of the fluid receiving means 51. When the apertures 84 are circular, they have a diameter within the range from about one-sixteenth inch to about 3 inches. Preferably, the diameters range from about one-eighth inch to about 2 inches as apertures of this diameter function satisfactorily in the process of this invention.

The cooling tower 6 has a vent 85 at its upper end to vent steam, water vapor and air. The lower end of the cooling tower has a reaction product outlet 88 communicating with an inlet 98 to the reaction product receiving vessel 9.

A de-entrainment means 86 is interposed between the distributor 82 and the vent 85 to prevent any reaction product mixture from being carried out of the vent. The blower 7 is connected to an inlet 87 near the bottom of the tower 6. Air is supplied in this manner for counter current heat exchange with the downward flowing reaction product mixture coming from the reaction vessel 1 and flowing into the cooling tower through the apertures 84 in distributor 82. Suitable packing material (not shown) is disposed in the cooling tower between the distributor 82 and the outlet 88. The packing material can be made up of sections of stainless steel pipe from about one-fourth inch to about 2 inches in length of from about one-fourth inch to about 3 inches in diameter, grid packing or of other suitable packing material. The packing material is retained within the tower by a suitable retaining means (not shown) such as a perforated plate or grate means or the like.

The receiving vessel 9 rests on support means 89. The bottom of the reaction product receiving vessel is indicated in dotted outline 90, showing an outlet 91 communicating with an outlet conduit 92.

The de-entrainment means 86 consists of material such as stainless steel wool, knitted polypropylene, polytetrafluorethylene or glass. Alternatively, the de-entrainment means 86 may consist of a tower in which gases ascend through a spiral path causing entrained reaction product mixture liquid to separate out and return downwardly to the cooling tower. Still other forms of de-entrainers are well known to those skilled in the art.

The following Examples illustrate the process of the invention. In Example 1, the process was performed as described above in relation to FIG. 1 and using a reaction vessel 1 as illustrated in FIG. 2; in Example 2, the reaction vessel was a modified construction as will be explained.

Example 1

In this example the reactants and their proportions by weight were as follows:

| | |
|---|---|
| Phosphoric acid | 93 |
| (76% $P_2O_5$, 60% thereof as polyphosphoric acid) | |
| Nitric acid | |
| (55% solution $HNO_3$) | 187 |
| Water | 90 |
| Ammonia (anhydrous) | 50 |

As described the bulk of the water and all of the nitric acid were mixed in conduit 4 and fed to the fluid receiving means 51 via the inlet 54 thereof. The balance of the water was added to the receiving vessel 9. Only 92 percent of the ammonia reactant was introduced into the reaction vessel 1 via the inlet 53 of the fluid receiving means 51, the balance being added to the liquid product in the receiving vessel 9.

The pressure drop across the reaction vessel was held at about 20 psig, the reactants being introduced at a rate such that the retention time of the reactants within the vessel 1 was about 0.1 second.

In the cooling tower 6, the liquid leaving the reaction vessel 1 at a temperature of about 107°C. was quenched by contact with about 100 scfm air per ton of liquid so as to be cooled rapidly to a temperature of about 43°C.

The product was a liquid of 20-20-0 grade having a pH of about 6.5 with an $N:P_2O_5$ ratio of 1:1. About 51 percent of the product was ammonium polyphosphates.

Example 2

The reactants were the same as in Example 1 and the process conditions were the same except in that the reaction vessel 1 was modified so as to have a separate inlet for the nitric acid reactant, the inlet 54 of the fluid receiving means 51 being fed with water only and the nitric acid being fed instead to an inlet in the column 72, this inlet being connected to a spray nozzle positioned within the topmost cylindrical section 60 of the column 72.

It was found that by using such a modification reaction vessel, a substantial proportion of the phosphoric acid reactant had already been ammoniated before meeting the nitric acid reactant. As a result, the product, although also a 20-20-0 grade liquid, had an ammonium polyphosphates content of about 56 percent. Thus the delayed introduction of the nitric acid into the reaction mixture substantially reduced the hydrolysis of the polyphosphoric acid components of the phosphoric acid feedstock as compared with the results of the procedure of Example 1, wherein even the brief contact that occurred between the acqueous nitric acid entering the vessel 1 through inlet 54 and the phosphoric acid entering through inlet 52 was sufficient to accomplish substantial hydrolysis of the polyphosphoric acids before these were stabilized by ammoniation.

I claim:

1. A process for the production of a near neutral liquid solution containing a mixture of ammoniated nitric, phosphoric and polyphosphoric acids which comprises continuously:

a. intermingling in a reaction chamber water, ammonia, nitric acid and phosphoric acid containing polyphosphoric acid components for ammoniation of said acids therein under highly turbulent conditions at a temperature within the range of 220° to 280°F to form a reaction mass comprising steam and a liquid solution of ammoniated phosphoric acid, ammoniated polyphosphoric acids, ammoniated nitric acid and water, the amount of ammonia fed to the reaction chamber being less than that required for neutralization of acids;
b. withdrawing the liquid solution and steam from the reaction chamber;
c. transferring the liquid solution and steam to a cooling tower wherein said liquid solution flows downwardly;
d. quenching said liquid solution in the cooling tower with an upwardly flowing countercurrent air stream to cool said liquid solution to a temperature within the range of 80 to 150°F and to remove steam and water vapor therefrom; and
e. adding ammonia to the quenched liquid solution in an amount sufficient to produce the near neutral liquid solution.

2. The process of claim 1, in which the reaction chamber is a tubular reactor and said nitric acid stream is introduced into said tubular reactor at a point downstream of the point of introduction of the ammonia phosphoric acid and polyphosphoric acid components.

3. The process of claim 1, in which the said reactants are caused to react in said reaction chamber within a period of 0.1 second to 15 minutes.

4. The process of claim 1, in which water is added to the liquid reaction product after said quenching thereof.

* * * * *